US012106764B2

(12) United States Patent
Tu et al.

(10) Patent No.: US 12,106,764 B2
(45) Date of Patent: Oct. 1, 2024

(54) PROCESSING METHOD OF SOUND WATERMARK AND SOUND WATERMARK PROCESSING APPARATUS

(71) Applicant: Acer Incorporated, New Taipei (TW)

(72) Inventors: Po-Jen Tu, New Taipei (TW); Jia-Ren Chang, New Taipei (TW); Kai-Meng Tzeng, New Taipei (TW)

(73) Assignee: Acer Incorporated, New Taipei (TW)

( * ) Notice: Subject to any disclaimer, the term of this patent is extended or adjusted under 35 U.S.C. 154(b) by 318 days.

(21) Appl. No.: 17/706,633

(22) Filed: Mar. 29, 2022

(65) Prior Publication Data

US 2023/0138678 A1 May 4, 2023

(30) Foreign Application Priority Data

Oct. 29, 2021 (TW) ................................ 110140365

(51) Int. Cl.
*G10L 19/018* (2013.01)
*G10L 19/16* (2013.01)

(52) U.S. Cl.
CPC .......... *G10L 19/018* (2013.01); *G10L 19/167* (2013.01)

(58) Field of Classification Search
CPC ............................ G10L 19/018; G10L 19/167
See application file for complete search history.

(56) References Cited

U.S. PATENT DOCUMENTS

| | | | | |
|---|---|---|---|---|
| 2008/0055214 A1* | 3/2008 | Kang | ........................ | G09G 3/20 345/87 |
| 2009/0125310 A1 | 5/2009 | Lee et al. | | |
| 2018/0374491 A1 | 12/2018 | Wang et al. | | |

FOREIGN PATENT DOCUMENTS

| | | |
|---|---|---|
| CN | 1592906 | 9/2010 |
| EP | 1927189 | 4/2016 |
| TW | 200926145 | 6/2009 |
| TW | I492224 | 7/2015 |
| TW | 560708 | 12/2016 |
| TW | 201944395 | 11/2019 |

* cited by examiner

*Primary Examiner* — Joseph Saunders, Jr.
(74) *Attorney, Agent, or Firm* — JCIPRNET

(57) ABSTRACT

A processing method of a sound watermark and a sound watermark processing apparatus are provided. In the method, an inserted position of a reference code in an initial watermark sequence is determined according to signal power of a main sound signal to generate an extended watermark sequence. The main sound signal and the extended watermark sequence are synthesized to generate a watermark-embedded sound signal. In this way, noise interference may be overcome.

16 Claims, 4 Drawing Sheets

PROCESSING METHOD OF SOUND WATERMARK AND SOUND WATERMARK PROCESSING APPARATUS

CROSS-REFERENCE TO RELATED APPLICATION

This application claims the priority benefit of Taiwan application serial no. 110140365, filed on Oct. 29, 2021. The entirety of the above-mentioned patent application is hereby incorporated by reference herein and made a part of this specification.

BACKGROUND

Technical Field

The disclosure relates to a sound signal processing technology, and in particularly, to a processing method of a sound watermark and a sound watermark processing apparatus.

Description of Related Art

Remote conferences allow people in different locations or spaces to have a conversation. Moreover, the development of conference-related equipment, protocols, and applications is mature. However, it is worth noting that some real-time conference programs may synthesize voice signals and sound watermark signals to identify the caller.

Inevitably, if a sound signal is interfered by noise, the correctness of the receiving end in determining the watermark may drop. Besides, when the power of part of the program segments of the sound signal is not greater than the transmission noise, identification performed by the receiver on the watermark-embedded sound signal may be affected, and it may also be difficult to correctly identify the identification codes in the watermark-embedded sound signal.

SUMMARY

In view of the above, the disclosure provides a processing method of a sound watermark and a sound watermark processing apparatus in which a reference code is inserted according to signal power, so that a program segment with low signal power in a sound watermark signal may be less affected by transmission noise, and accuracy of identification of a watermark identification code at a receiving end is thereby improved.

A processing method of a sound watermark provided by the embodiments of the disclosure is suitable for a conference terminal. The processing method of the sound watermark includes but not limited to the following steps. An inserted position of a reference code in an initial watermark sequence is determined according to signal power of a main sound signal to generate an extended watermark sequence. The extended watermark sequence includes the initial watermark sequence and the reference code, and arrangement of an identification code and the reference code in the initial watermark sequence is determined according to the signal power. The reflected sound signal is the sound signal that the sound emitted by an analog sound source is reflected by an external object and recorded through a microphone. The main sound signal and the extended watermark sequence are synthesized to generate a watermark-embedded sound signal.

A sound watermark processing apparatus provided by the embodiments of the disclosure includes but not limited to a memory and a processor. The memory is configured to store a program code. The processor is coupled to the memory. The processor is configured to load and execute the program code to execute the following steps. An inserted position of a reference code in an initial watermark sequence is determined according to signal power of a main sound signal to generate an extended watermark sequence. The extended watermark sequence includes the initial watermark sequence and the reference code, and arrangement of an identification code and the reference code in the initial watermark sequence is determined according to the signal power. The main sound signal and the extended watermark sequence are synthesized to generate a watermark-embedded sound signal.

To sum up, in the processing method of the sound watermark and the sound watermark processing apparatus provided by the embodiments of the disclosure, the arrangement of the reference code and the identification code in the initial watermark sequence is determined according to magnitude of the signal power to generate the extended watermark sequence. In this way, the change of signal power may be dynamically responded, so that the interference of transmission noise may be effectively lowered.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
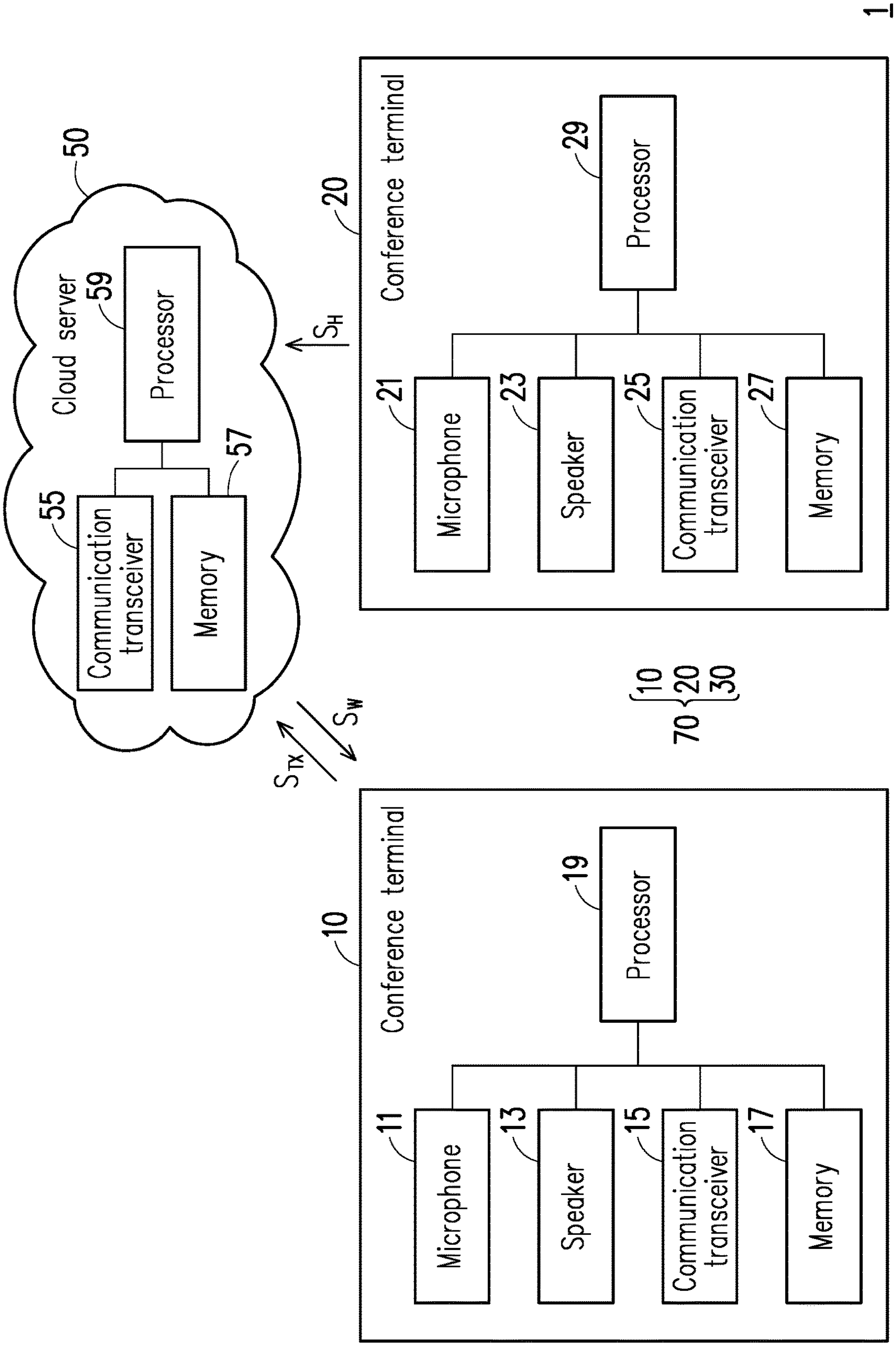
FIG. 1 is a schematic diagram of a conference call system according to an embodiment of the disclosure.

FIG. 1 is a schematic diagram of a conference call system 1 according to an embodiment of the disclosure. With reference to FIG. 1, the conference call system 1 includes but not limited to conference terminals 10 and 20 and a conference terminal 50.

The conference terminals 10 and 20 may be wired phones, mobile phones, Internet phones, tablet computers, desktop computers, notebook computers, or smart speakers.

The conference terminal 10 includes but not limited to a microphone 11, a speaker 13, a communication transceiver 15, a memory 17, and a processor 19.

The microphone 11 may be a dynamic microphone, a condenser microphone, or an electret condenser microphone. The microphone 11 may also be a combination of other electronic components that may receive sound waves (e.g., human voice, environmental sound, machine operation sound, etc.) and convert the sound waves into sound signals, analog-to-digital converters, filters, and audio processors. In an embodiment, the microphone 11 is used for receiving/recording the caller, so as to obtain a received call sound signal. In some embodiments, the received call sound signal may include the voice of the caller, the sound from the speaker 13, and/or other ambient sounds.

The speaker 13 may be a horn or a loudspeaker. In an embodiment, the speaker 13 is used to play sound.

The communication transceiver 15 is, for example, a transceiver (which may include but not limited to a connection interface, a signal converter, a communication protocol processing chip, and other devices) that supports a wired network such as an Ethernet network, an optical fiber network, or a cable, and may also be a transceiver (which may include but not limited to an antenna, a digital-to-analog/analog-to-digital converter, a communication protocol processing chip, and other devices) that supports a wireless network such as Wi-Fi and a fourth-generation (4G), fifth-generation (5G), or later generation mobile network. In an embodiment, the communication transceiver 15 is configured to transmit or receive data.

The memory 17 may be a fixed or movable random access memory (RAM) in any form, a read only memory (ROM), a flash memory, a hard disk drive (HDD), a solid-state drive (SSD), or other similar devices. In an embodiment, the memory 17 is used to store a program code, a software module, a configuration, data (e.g., a sound signal, a watermark sequence, a main sound signal, or a watermark-embedded sound signal), or a file.

The processor 19 is coupled to the microphone 11, the speaker 13, the communication transceiver 15, and the memory 17. The processor 19 may be a central processing unit (CPU), a graphic processing unit (GPU), or a programmable microprocessor for general or special use, a digital signal processor (DSP), a programmable controller, a field programmable gate array (FPGA), an application-specific integrated circuit (ASIC), other similar devices, or a combination of the foregoing devices. In an embodiment, the processor 19 is configured to perform all or part of the operations of the conference terminal 10 to which the processor 19 belongs, and may load and execute various software modules, files, and data stored in the memory 17.

The conference terminal 20 includes but not limited to a microphone 21, a speaker 23, a communication transceiver 25, a memory 27, and a processor 29. The implementation and functions of the microphone 21, the speaker 23, the communication transceiver 25, the memory 27, and the processor 29 may be obtained with reference to the description of the speaker 13, the microphone 11, the speaker 13, the communication transceiver 15, the memory 17, and the processor 19, so description thereof is not repeated herein.

The cloud server 50 is directly or indirectly connected to the conference terminals 10 and 20 via a network. The cloud server 50 may be a computer system, a server, or a signal processing apparatus. In an embodiment, the conference terminals 10 and 20 may also act as the cloud server 50. In another embodiment, the cloud server 50 may be used as an independent cloud server different from the conference terminals 10 and 20. In some embodiments, the cloud server 50 includes but not limited to a same or similar communication transceiver 55, a memory 57, and a processor 59, and description of the implementation and functions of these devices is not repeated herein.

In an embodiment, a sound watermark processing apparatus 70 may be the conference terminals 10 and 20 and/or the cloud server 50. The sound watermark processing apparatus 70 is used to process a sound watermark signal, and description thereof is to be provided in detail in subsequent embodiments.

In the following paragraphs, a method provided by the embodiments of the disclosure is described together with the various apparatuses, devices, and modules in the conference call system 1. The steps of the method may be adjusted according to actual implementation and are not limited thereto.

In addition, it should be noted that, for the convenience of description, the same devices may implement the same or similar operations, and description thereof is not repeated. For instance, the processor 19 of the conference terminal 10, the processor 29 of the conference terminal 20, and/or the processor 59 of the cloud server 50 may all implement the same or similar methods in the embodiments of the disclosure.

Figure 2:
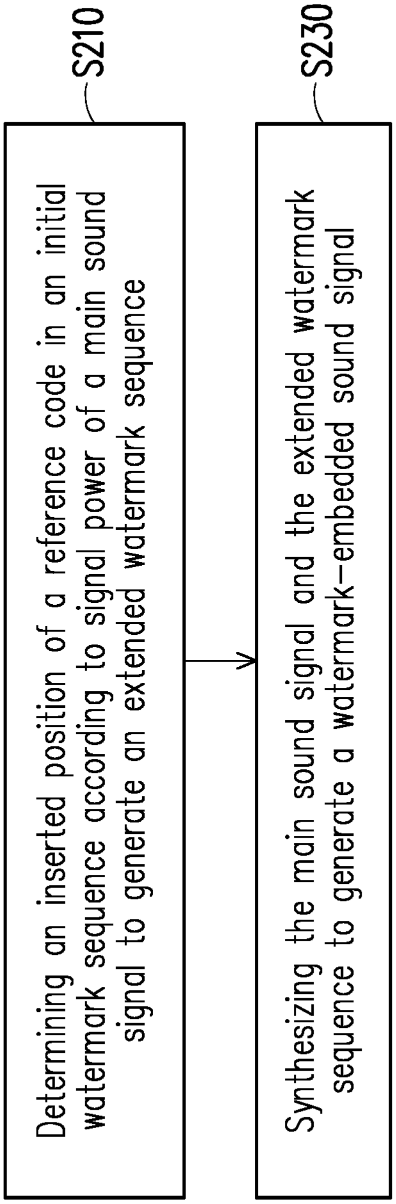
FIG. 2 is a flow chart of a processing method of a sound watermark according to an embodiment of the disclosure.

FIG. 2 is a flow chart of a processing method of a sound watermark according to an embodiment of the disclosure. With reference to FIG. 2, the processor 59 determines an inserted position of a reference code in an initial watermark sequence according to signal power of a main sound signal to generate an extended watermark sequence (step S210). To be specific, it is assumed that the conference terminals 10 and 20 establish a conference call. For instance, a conference may be established through video software, voice calling software, or making a phone call, and a caller may start talking. After the microphone 21 performs recording/receiving, the processor 29 may obtain a main sound signal $S_H$. The main sound signal $S_H$ is related to voice content (may also include ambient sound or other noise) of the caller corresponding to the conference terminal 20.

Next, the processor 59 of the cloud server 50 receives the main sound signal $S_H$ from the conference terminal 20 through the communication transceiver 55 (i.e., via a network interface). In some embodiments, the main sound signal $S_H$ may undergo echo cancellation, noise filtering, and/or other sound signal processing.

Note that in order to identify accuracy of a watermark identification code, in a preprocessing stage of a transmitting end, a reference code (or a reference symbol, e.g., 0) different from the watermark identification code may be added before a sequence of the watermark identification code to facilitate signal synchronization. The sequence in which the reference code is added may be embedded in the main sound signal to generate a watermark-embedded sound signal to be transmitted to other devices via the network. During transmission, the sound signal is interfered by transmission noise. Since the signal power of the main sound signal in different program segments (a program segment is, for example, a sound signal of a specific time period) may change, a signal-to-noise ratio (SNR) may change accordingly. However, a low signal-to-noise ratio may not be conducive to the subsequent identification of the watermark identification code. On the other hand, there is a need for immediacy of conference calls. Therefore, within a short program segment (e.g., 10 milliseconds), a correct and appropriate sound signal is required to be transmitted. Further, during the conference call, some users may not speak, but the watermark identification code cannot be transmitted during this silent period.

Based on the foregoing, in the embodiments of the disclosure, it is not limited to inserting the reference code only before the sequence of the watermark identification code, and the signal-to-noise ratio is also considered. An extended watermark sequence includes an initial watermark sequence and one or more reference codes. Each bit in the initial watermark sequence is a watermark identification code (hereinafter referred to as an identification code). In an embodiment, the identification code is encoded in a multi-bit system, and this multi-bit system provides a plurality of values in each of one or more bits of the initial watermark sequence. Taking the binary system as an example, the value of each bit in the watermark identification code may be "−1" or "1". Taking the hexadecimal system as an example, the value of each bit in the watermark identification code may be "0", "1", "2", . . . , "E", and "F". In another embodiment, the identification code is coded with letters, characters, and/or symbols. For instance, the value of each bit in the initial watermark sequence may be any one of English letters "A" to "Z". On the other hand, the reference code is a symbol other than the identification code. Taking the identification codes being "−1" and "1" as an example, the reference code may be 0.

Figure 3:
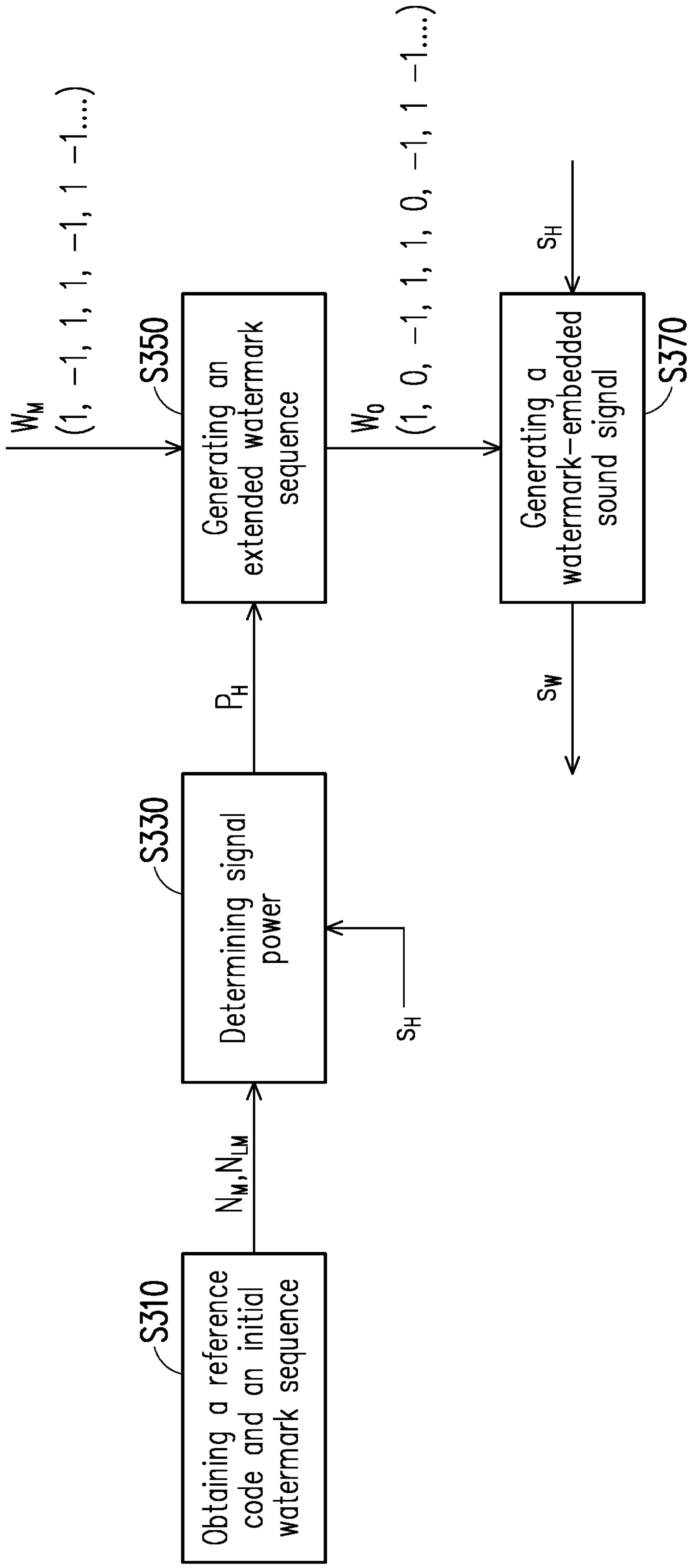
FIG. 3 is a flow chart of a method of generating a watermark-embedded sound signal according to an embodiment of the disclosure.

Arrangement of the identification codes and the reference codes in the initial watermark sequence is determined according to the signal power of the main sound signal. To be specific, FIG. 3 is a flow chart of a method of generating a watermark-embedded sound signal according to an embodiment of the disclosure. With reference to FIG. 3, the processor 59 obtains a length of a known reference code and the initial watermark sequence (step S310). To be more specific, it is assumed that a number of bits (or an identification code length) $N_M$ (i.e., a number of identification codes) of an initial watermark sequence $W_M$ is known, such as 64, 128, or 256. A number of bits (or a predetermined number) of the reference codes (i.e., a number of reference codes) $N_{LM}$ is also determined in advance. For instance, if the number of bits $N_M$ of the initial watermark sequence $W_M$ is 128, the predetermined number of reference codes $N_{LM}$ may be 8 or 16, but it is not limited thereto. In an embodiment, the predetermined number of reference codes $N_{LM}$ is related to a predetermined degree of tolerance. If the predetermined number of reference codes $N_{LM}$ increases, the degree of tolerance grows. If the predetermined number of reference codes $N_{LM}$ decreases, the degree of tolerance drops. However, the predetermined number of reference codes $N_{LM}$ may still be changed based on a length of the interval, a number ratio, or other factors. It thus can be seen that $N_M$+$N_{LM}$ codes/symbols are required to be transmitted in each interval for transmitting the extended watermark sequence.

The processor 59 determines signal power $P_H$ of the current program segment in the main sound signal $S_H$ (step S330). To be specific, the main sound signal $S_H$ includes one or more program segments, and each program segment corresponds to a symbol/code (which may be an identification code or a reference code) in an extended watermark sequence $W_0$ (the length thereof is, for example, 256 or 512 bits, which should however not be construed as a limitation in the disclosure). The processor 59 calculates the signal power $P_H$ corresponding to each program segment of the main sound signal $S_H$. Every other program segment, the processor 59 calculates the signal power $P_H$ (e.g., average signal power, median signal power, or a mode of the signal power) of the sound signal in this program segment. Therefore, the processor 59 may determine the signal power $P_H$ of the main sound signal $S_H$ in different program segments.

In an embodiment, the processor 59 determines an inserted position of the reference code according to a comparison result of the signal power $P_H$ and a power threshold $Th_p$, and generates the extended watermark sequence $W_0$ accordingly. To be specific, the power threshold $Th_p$ (e.g., 0.3, 0.5, or 0.7) is related to an allowable noise value of the main sound signal $S_H$ during transmission. For instance, according to the environment and experimental experience, the processor 59 may set the power threshold $Th_p$ to 0.3, but the disclosure is not limited thereto.

In an embodiment, in response to the comparison result that the signal power $P_H$ is greater than the power threshold $Th_p$, the processor 59 sets the value of a specific bit in the extended watermark sequence $W_0$ to the value of a specific bit in the initial watermark sequence $W_M$. In response to the signal power $P_H$ being not greater than the power threshold $Th_p$, the processor 59 sets the value of a specific bit in the extended watermark sequence $W_0$ as the value of the reference code according to the predetermined number of those reference codes $N_{LM}$. That is, the processor 59 determines whether to treat this bit/position of the extended watermark sequence $W_0$ as the inserted position of the reference code.

The initial watermark sequence $W_M$ is [1, −1, 1, 1, −1, 1−1], for example. It is assumed that a first program segment of the main sound signal $S_H$ is currently processed, and if the signal power $P_H$ of this program segment is greater than the power threshold $Th_p$, the processor 59 treats the value of the first bit (i.e., "1") in the initial watermark sequence $W_M$ as the value of the first bit of the extended watermark sequence $W_0$. Next, regarding a second program segment, if the signal power $P_H$ of this program segment is not greater than the power threshold $Th_p$, the processor 59 treats the value of the reference code (i.e., "0") as the value of the second bit of the extended watermark sequence $W_0$. The rest may be deduced by analogy. The processor 59 sequentially determines whether to insert a reference code into the extended watermark sequence $W_0$ for successive program segments, and it is not limited to directly placing all reference codes before the initial watermark sequence $W_M$.

In an embodiment, in response to that a number $c_{LM}$ of those reference code inserted into the extended watermark sequence $W_0$ is equal to the predetermined number of reference codes $N_{LM}$, the processor 59 may directly set the value of a specific bit in the extended watermark sequence $W_0$ to the value of a specific bit in the initial watermark sequence $W_M$. That is, the number of reference codes in a single extended watermark sequence $W_0$ is equal to the predetermined number $N_{LM}$. As long as the predetermined number $N_{LM}$ of reference codes are arranged to extended watermark sequence $W_0$, regardless of the comparison result of the signal power, the remaining bits in the extended watermark sequence $W_0$ may be sequentially set to the values of the bits that are not arranged in the initial watermark sequence $W_M$.

In contrast, in response to that the number $c_{LM}$ of those reference codes inserted into the extended watermark sequence $W_0$ is not equal to the predetermined number of reference codes $N_{LM}$, the processor 59 may determine whether to insert a reference code into the corresponding bit of the extended watermark sequence $W_0$ according to the comparison result of the signal power $P_H$ of the current program segment and the power threshold $Th_p$ and the number of bits $N_M$ in the initial watermark sequence $W_M$. That is, as long as the reference codes of the predetermined number $N_{LM}$ are not inserted into the extended watermark sequence $W_0$, the comparison result of the signal power $P_H$ still needs to be considered.

Note that the number of identification codes in a single extended watermark sequence $W_0$ is equal to the number of bits $N_M$ of the initial watermark sequence $W_M$. Therefore, in response to the number of identification codes inserted into the extended watermark sequence $W_0$ being equal to the number of bits $N_M$ of the initial watermark sequence $W_M$, the processor 59 may directly set the value of the corresponding bit in the extended watermark sequence $W_0$ of the subsequent program segment as the value of the reference code. That is, as long as the number of identification codes that are arranged to extend the watermark sequence $W_0$ is equal to the number of bits $N_M$, regarding a remaining bit in the extended watermark sequence $W_0$, this bit may be sequentially set as the value of the reference code until the number of symbols/codes is $N_M+N_{LM}$ regardless of the comparison result of the signal power.

In contrast, in response to that the number of those identification codes inserted into the extended watermark sequence $W_0$ is not equal to the number of bits $N_M$ of the initial watermark sequence $W_M$, the processor 59 may determine whether to insert a reference code into the corresponding bit of the extended watermark sequence $W_0$ according to the comparison result of the signal power $P_H$ of the current program segment and the power threshold $Th_p$ and the predetermined number of reference codes $N_{LM}$. That is, as long as the identification codes of the number of bits $N_{LM}$ are not inserted into the extended watermark sequence $W_0$, the comparison result of the signal power $P_H$ still needs to be considered.

In an embodiment, a relationship between the identification codes and the reference codes of the extended watermark sequence $W_0$ and the initial watermark sequence $W_M$ may be expressed as follows:

$$W_0 = \begin{cases} 1, (P_H > Th_P,\ c_{LM} < N_{LM},\ W_M = 1) \text{ or } (c_{LM} = N_{LM},\ W_M = 1) \\ -1, P_H > Th_P,\ c_{LM} < N_{LM},\ W_M = -1) \text{ or } (c_{LM} = N_{LM},\ W_M = -1) \\ 0, \text{ others} \end{cases} \quad (1)$$

$c_{LM}$ is the number of reference codes currently inserted into the extended watermark sequence $W_0$, and $N_{LM}$ is the predetermined number of reference codes. To be specific, the processor 59 determines the value of the corresponding bit in the extended watermark sequence $W_0$ to be the identification code or the reference code in the initial watermark sequence $W_M$ according to the signal power $P_H$ of the main sound signal $S_H$ in each program segment. When the signal power $P_H$ is greater than the power threshold $Th_p$, it means that the corresponding program segment of the main sound signal $S_H$ may withstand the interference of transmission noise during the transmission process. Therefore, if the signal power $P_H$ is greater than the power threshold ThP, the processor 59 may set the extended watermark sequence $W_0$ to a value (e.g., 1, and −1) in the initial watermark sequence $W_M$. Besides, when the number of reference codes $c_{LM}$ inserted into the extended watermark sequence $W_0$ is equal to the predetermined number of reference codes $N_{LM}$ (i.e., $c_{LM}=N_{LM}$), the processor 59 may directly set the value of the corresponding bit of the extended watermark sequence $W_0$ to the value (i.e., the identification code) of the corresponding bit of the initial watermark sequence $W_M$ without considering the comparison result of the signal power $P_H$. Next, when the signal power $P_H$ of a specific program segment of the main sound signal $S_H$ is not greater than the power threshold $Th_p$, it means that it is difficult for this program segment to overcome the interference of transmission noise during the transmission process, so an error rate of identifying the identification code at a receiving end increases. Therefore, if the signal power $P_H$ is not greater than the power threshold $Th_p$, the processor 59 sets the value of the corresponding bit of the extended watermark sequence $W_0$ as a reference code (e.g., "0"). In addition, an order of the identification codes in the extended watermark sequence $W_0$ is the same as an order of the identification codes in the initial watermark $W_M$. For instance, if the initial watermark sequence $W_M$ is "1, −1, 1, 1, −1, 1, −1", the extended watermark sequence $W_0$ may be "1, 0, −1, 1, 1, 0, −1", 1, −1" or "1, 0, −1, 1, 1, 0, 0, −1, 0, 1, −1".

It can thus be seen that the inserted position of a reference code in the extended watermark sequence $W_0$ is related to the signal power $P_H$ of the main sound signal $S_H$. Besides, the number of identification codes and reference codes in the extended watermark sequence $W_0$ are determined. Therefore, if the number of any one of the identification codes and the reference codes meets the aforementioned requirement (e.g., the number of bits $N_M$ or the predetermined number $N_{LM}$), the remaining bits of the extended watermark sequence $W_0$ may be directly supplemented with another code.

With reference to FIG. 2, the processor 59 synthesizes the main sound signal $S_H$ and the extended watermark sequence $W_0$ to generate a watermark-embedded sound signal $S_W$ (step S230). For instance, the processor 59 may add the extended watermark sequence $W_0$ to the main sound signal $S_H$ through a spread spectrum, echo hiding, phase encoding, etc. in a time domain to form the watermark-embedded sound signal $S_W$. Alternatively, the processor 19 may add the extended watermark sequence $W_0$ to the main sound signal $S_H$ by modulated carries, subtracting frequency bands, etc. in a frequency domain. Each program segment in the main sound signal $S_H$ corresponds to one symbol/code in the extended watermark sequence $W_0$.

Taking FIG. 3 as an example, with reference to FIG. 3, the processor 59 generates the watermark-embedded sound signal $S_W$ according to the extended watermark sequence $W_0$ and the main sound signal $S_H$ (step S370). It is assumed that a part of the extended watermark sequence $W_0$ is [1, 0, −1, 1, 1, 0, −1, 1−1], the program segments of the main sound signal $S_H$ may be embedded in the symbols/codes (e.g., "0", "4", or "1") in the extended watermark sequence $W_0$.

Since the inserted position of the reference code in the extended watermark sequence $W_0$ is determined according to the signal power $P_H$, the watermark-embedded sound signal $S_W$ may effectively reduce the influence of transmission noise on a signal with low signal power, and accuracy of watermark identification at the receiving end is accordingly improved.

Figure 4:
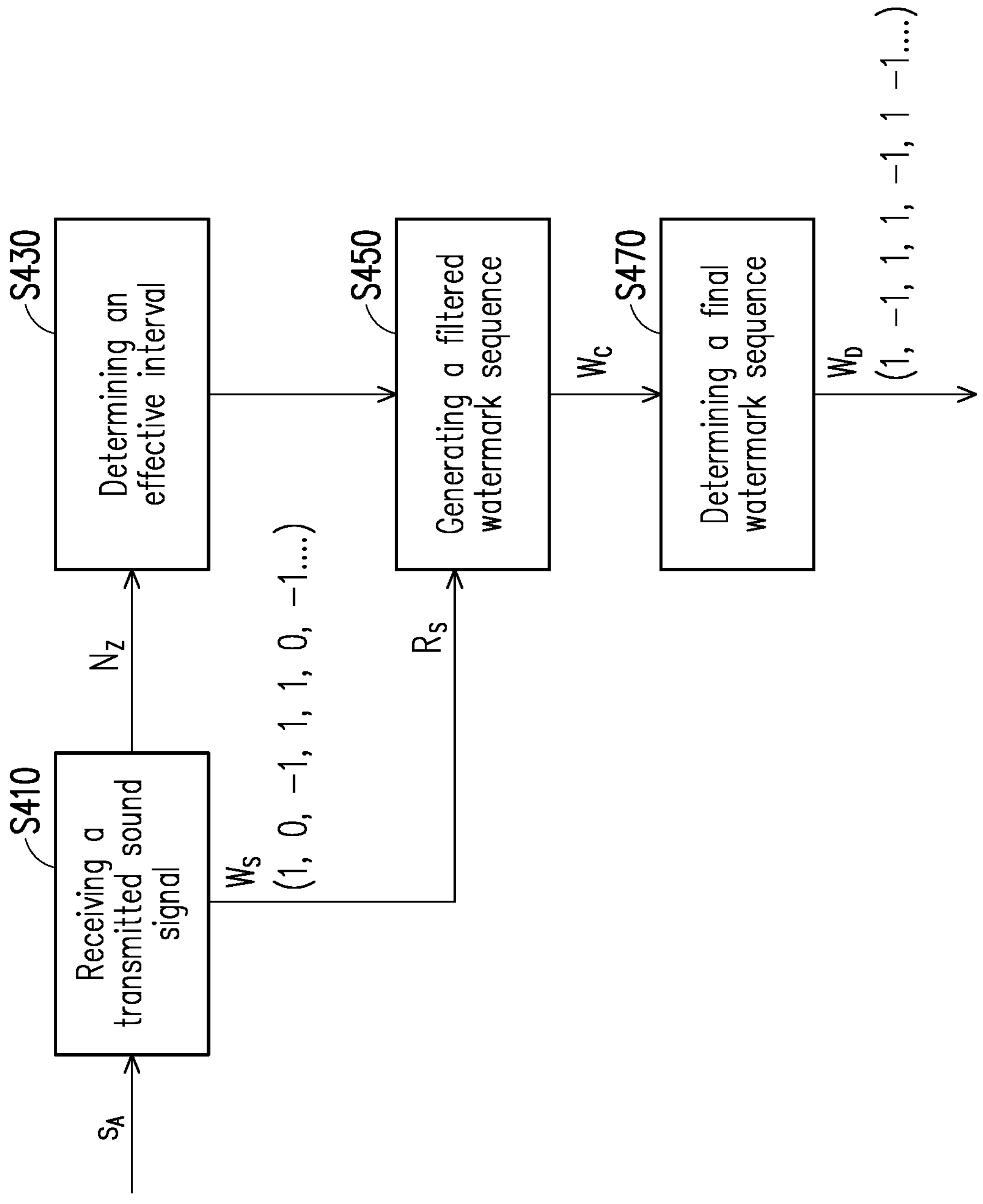
FIG. 4 is a flow chart of processing a watermark identification code according to an embodiment of the disclosure.

FIG. 4 is a flow chart of processing a watermark identification code according to an embodiment of the disclosure. With reference to FIG. 1 and FIG. 4, the processor 1 receives a transmitted sound signal $S_A$ via the network (step S410). The transmitted sound signal $S_A$ includes the transmitted watermark-embedded sound signal $S_W$ and transmission noise SN. That is, the processor 19 of the conference terminal 10 receives the watermark-embedded sound signal $S_W$ via the network through the communication transceiver 15 to obtain the transmitted sound signal $S_A$ (i.e., the watermark-embedded sound signal $S_W$ interfered by the transmission noise SN).

Besides, a detecting end (or the receiving end) does not need to process the sound signal in real time, so the processor 19 may use the sound signal corresponding to the entire interval of the extended watermark sequence $W_0$ to identify the identification code. The processor 19 may determine a correlation $R_S$ between the sound signal of each program segment of the transmitted sound signal $S_A$ in any interval and any identification code through the cross correlation technology and may determine the corresponding symbol/code (i.e., one of the identification code or the reference code) accordingly. Taking the identification code "1" as an example, if the processor 19 determines that the correlation $R_S$ between the sound signal of the current program segment and "1" is greater than a corresponding correlation threshold, the processor 19 determines that the code of this program segment is the identification code "1". If the processor 19 determines that the correlation $R_S$ between the sound signal of the current program segment and "1" is less than a negative value of the relevant threshold, the processor 19 determines that the code of this program segment is the identification code "−1". If the correlation $R_S$ is in other cases, the processor 19 determines that the code of this program segment is a reference code (e.g., "0"). If it is determined to transmit the codes (a collection thereof is referred to as a detected watermark sequence $W_S$ hereinafter) corresponding to all the program segments of the sound signal $S_A$ in an interval, the processor 19 may count a detected number $N_Z$ of the reference codes in the detected watermark sequence $W_S$.

The processor 19 determines one or more effective intervals in the transmitted sound signal $S_A$ according to a comparison result of the detected number $N_Z$ of the reference codes and the predetermined number of the reference codes in a watermark sound signal (step S430). To be specific, ideally, it is preferable that the detected number $N_Z$ is equal to the predetermined number $N_{LM}$. However, the interference of the transmission noise SN may still affect the identification result of the codes. In an embodiment, in response to the comparison result that the detected number $N_Z$ of the reference codes is less than or equal to (or not more than) the predetermined number $N_{LM}$ of the reference codes, the processor 19 sets a corresponding detection section (i.e., the detected watermark sequence $W_S$ corresponding to the section in the transmitted sound signal $S_A$) of the transmitted sound signal $S_A$ as a valid interval. That is, when $N_Z \leq N_{LM}$, it is relatively easy to identify the identification code in the detected section to be used as a retained section. However, in response to the comparison result that the detected number $N_Z$ of the reference codes is greater than the predetermined number $N_{LM}$ of the reference codes, the processor 191 does not set the corresponding detection section of the transmitted sound signal $S_A$ as the valid interval. For instance, the processor 191 sets the corresponding detection section as an invalid interval. That is, when $N_Z > N_{LM}$, it may not be easy to identify the identification code in the detection section. Therefore, the processor 19 may directly exclude the interval having high uncertainty factors in the transmitted sound signal $S_A$, so as to improve the accuracy of subsequent identification. The processor 19 may further generate a final watermark sequence $W_D$ according to the detected watermark sequence $W_S$ of one or more valid intervals in the transmitted sound signal $S_A$.

In an embodiment, the processor 19 may generate a filtered watermark sequence We according to the detected watermark sequence $W_S$ of the valid interval (step S450). To be specific, since the effective interval corresponds to $N_Z \leq N_{LM}$, the number of identification codes in the detected watermark sequence $W_S$ may be greater than or equal to the number of bits $N_M$ of the initial watermark sequence $W_M$. In an embodiment, the processor 19 may retain a code with a greater correlation (absolute value) with the identification code in a valid interval according to the number of bits $N_M$ of the initial watermark sequence $W_M$ and may exclude codes with a smaller correlation (absolute value) with the identification code in this valid interval. That is, the processor 19 may select the first $N_M$ identification codes with greater correlation from the detected watermark sequence $W_S$ in the valid interval and may combine the selected identification codes into the filtered watermark sequence $W_C$ according to their order. The remaining codes with less correlation may be treated as reference codes, so these codes may not be used to facilitate identification of the identification codes and thus may be directly excluded.

In an embodiment, assuming that there are $N_K$ valid intervals, so the processor 19 treats the collection of individual statistical indicators of one or more bits in the detected watermark sequence $W_S$ of those valid intervals as the final watermark sequence $W_D$ (step S470). To be specific, the filtered watermark sequence $W_C$ is a sequence corresponding to the detected watermark sequence $W_S$ after excluding codes with less correlation. If there are $N_K$ valid intervals, the processor 19 may determine the statistical indicators (e.g., the average, the median, or the mode) of the codes/symbols of the bits/positions in the filtered watermark sequence $W_C$ for these valid intervals. Taking the average as an example, the relationship between the filtered watermark sequence $W_C$ and the final watermark sequence $W_D$ may be expressed as follows:

$$W_D(m) = \frac{1}{N_K} \cdot \sum_{1}^{N_K} W_C(m) \tag{2}$$

$W_D$ (m) is the identification code of the $m^{th}$ bit/position in the final watermark sequence $W_D$, and $W_C$ (m) is the identification code of the $m^{th}$ bit/position in the filtered watermark sequence $W_C$. The $W_D$ (m) on $N_M$ bits is arranged according to their order to form the final watermark sequence $W_D$.

In some embodiments, if there is only one valid interval, the processor 19 may directly treat the filtered watermark sequence $W_C$ of this valid interval as the final watermark sequence $W_D$.

In view of the foregoing, in the processing method of the sound watermark and the sound watermark processing apparatus provided by the embodiments of the disclosure, the inserted position of the reference code in the initial watermark sequence is determined according to the magnitude of the signal power. In this way, the influence of transmission noise on the sound signal with low signal power in the watermark-embedded sound signal may be lowered, which is beneficial to the identification of the watermark identification code at the detecting end. On the other hand, by limiting the number of bits of the identification codes or reference codes, the interval having high uncertainty factors and the symbols/codes with less correlation with the identification code may be excluded. In this way, the watermark identification codes may be accurately determined.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A processing method of a sound watermark, suitable for a conference terminal, the processing method of the sound watermark comprises:

determining an inserted position of at least one reference code in an initial watermark sequence according to signal power of a main sound signal to generate an extended watermark sequence, wherein the extended watermark sequence comprises the initial watermark sequence and the at least one reference code, and arrangement of at least one identification code and the at least one reference code in the initial watermark sequence is determined according to the signal power; and synthesizing the main sound signal and the extended watermark sequence to generate a watermark-embedded sound signal;

wherein the step of determining the inserted position of the at least one reference code in the initial watermark sequence according to the signal power of the main sound signal further comprises:

determining the inserted position according to a comparison result of the signal power and a power threshold;

wherein the step of determining the inserted position according to the comparison result of the signal power and the power threshold further comprises:

setting a value of a first bit in the extended watermark sequence to a value of a second bit in the initial watermark sequence according to a predetermined number of the at least one reference code in response to the comparison result that the signal power is greater than the power threshold; and setting the value of the first bit in the extended watermark sequence to a value of the at least one reference code according to the predetermined number of the at least one reference code in response to the comparison result that the signal power is not greater than the power threshold, wherein the first bit is treated as the inserted position.

2. The processing method of the sound watermark according to claim 1, wherein the predetermined number of the at least one reference code is related to a predetermined degree of a tolerance.

3. The processing method of the sound watermark according to claim 1, wherein the step of determining the inserted position according to the comparison result of the signal power and the power threshold further comprises:

setting the value of the first bit in the extended watermark sequence to the value of the second bit in the initial watermark sequence in response to that a number of the at least one reference code inserted into the extended watermark sequence is equal to the predetermined number of the at least one reference code; and determining whether to insert the at least one reference code into the first bit according to the comparison result and a number of bits in the initial watermark sequence in response to that the number of the at least one reference code inserted into the extended watermark sequence is not equal to the predetermined number of the at least one reference code.

4. The processing method of the sound watermark according to claim 1, further comprising:

receiving a transmitted sound signal via a network, wherein the transmitted sound signal comprises a transmitted watermark sound signal;

determining at least one valid interval in the transmitted sound signal according to a comparison result of a detected number of the at least one reference code and a predetermined number of the at least one reference code in the transmitted sound signal; and generating a final watermark sequence according to a detected watermark sequence of the at least one valid interval.

5. The processing method of the sound watermark according to claim 4, wherein the at least one valid interval comprises a plurality of valid intervals, and the step of generating the final watermark sequence further comprises:

treating a collection of individual statistical indicators of at least one bit in the detected watermark sequence of each valid interval as the final watermark sequence.

6. The processing method of the sound watermark according to claim 4, wherein the at least one valid interval comprises a plurality of valid intervals, and the step of generating the final watermark sequence further comprises:

treating a collection of individual averages of at least one bit in the detected watermark sequence of each valid interval as the final watermark sequence.

7. The processing method of the sound watermark according to claim 4, wherein the step of determining the at least one valid interval in the transmitted sound signal according to the comparison result of the detected number of the at least one reference code and the predetermined number of the at least one reference code in the transmitted sound signal further comprises:

setting a corresponding detection section of the transmitted sound signal as the at least one valid interval in response to the comparison result that the detected number of the at least one reference code is not greater than the predetermined number of the at least one reference code; and not setting the corresponding detection section of the transmitted sound signal as the at least one valid interval in response to the comparison result that the detected number of the at least one reference code is greater than the predetermined number of the at least one reference code.

8. The processing method of the sound watermark according to claim 4, wherein the step of generating the final watermark sequence further comprises:

retaining a code in the at least one valid interval that has a greater correlation with the at least one identification code according to the number of bits in the initial watermark sequence, wherein a code in the at least one valid interval that has a small correlation with the at least one identification code is excluded.

9. A sound watermark processing apparatus, comprising:

a memory, configured to store a program code; and a processor, coupled to the memory, configured to load and execute the program code for:

determining an inserted position of at least one reference code in an initial watermark sequence according to signal power of a main sound signal to generate an extended watermark sequence, wherein the extended watermark sequence comprises the initial watermark sequence and the at least one reference code, and arrangement of at least one identification code and the at least one reference code in the initial watermark sequence is determined according to the signal power;

synthesizing the main sound signal and the extended watermark sequence to generate a watermark-embedded sound signal;

determining the inserted position according to a comparison result of the signal power and a power threshold;

setting a value of a first bit in the extended watermark sequence to a value of a second bit in the initial watermark sequence according to a predetermined number of the at least one reference code in response to the comparison result that the signal power is greater than the power threshold; and setting the value of the first bit in the extended watermark sequence to a value of the at least one reference code according to the predetermined number of the at least one reference code in response to the comparison result that the signal power is not greater than the power threshold, wherein the first bit is treated as the inserted position.

10. The sound watermark processing apparatus according to claim 9, wherein the predetermined number of the at least one reference code is related to a predetermined degree of a tolerance.

11. The sound watermark processing apparatus according to claim 9, wherein the processor is further configured for:

setting the value of the first bit in the extended watermark sequence to the value of the second bit in the initial watermark sequence in response to that a number of the at least one reference code inserted into the extended watermark sequence is equal to the predetermined number of the at least one reference code; and determining whether to insert the at least one reference code into the first bit according to the comparison result and a number of bits in the initial watermark sequence in response to that the number of the at least one reference code inserted into the extended watermark sequence is not equal to the predetermined number of the at least one reference code.

12. The sound watermark processing apparatus according to claim 9, wherein the processor is further configured for:

receiving a transmitted sound signal via a network, wherein the transmitted sound signal comprises a transmitted watermark sound signal;

determining at least one valid interval in the transmitted sound signal according to a comparison result of a detected number of the at least one reference code and a predetermined number of the at least one reference code in the transmitted sound signal; and generating a final watermark sequence according to a detected watermark sequence of the at least one valid interval.

13. The sound watermark processing apparatus according to claim 12, wherein the processor is further configured for:

treating a collection of individual statistical indicators of at least one bit in the detected watermark sequence of each valid interval as the final watermark sequence.

14. The sound watermark processing apparatus according to claim 12, wherein the processor is further configured for:

treating a collection of individual averages of at least one bit in the detected watermark sequence of each valid interval as the final watermark sequence.

15. The sound watermark processing apparatus according to claim 12, wherein the processor is further configured for:

setting a corresponding detection section of the transmitted sound signal as the at least one valid interval in response to the comparison result that the detected number of the at least one reference code is not greater than the predetermined number of the at least one reference code; and not setting the corresponding detection section of the transmitted sound signal as the at least one valid interval in response to the comparison result that the detected number of the at least one reference code is greater than the predetermined number of the at least one reference code.

16. The sound watermark processing apparatus according to claim 12, wherein the processor is further configured for:

retaining a code in the at least one valid interval that has a greater correlation with the at least one identification code according to the number of bits in the initial watermark sequence, wherein a code in the at least one valid interval that has a small correlation with the at least one identification code is excluded.

* * * * *